United States Patent Office

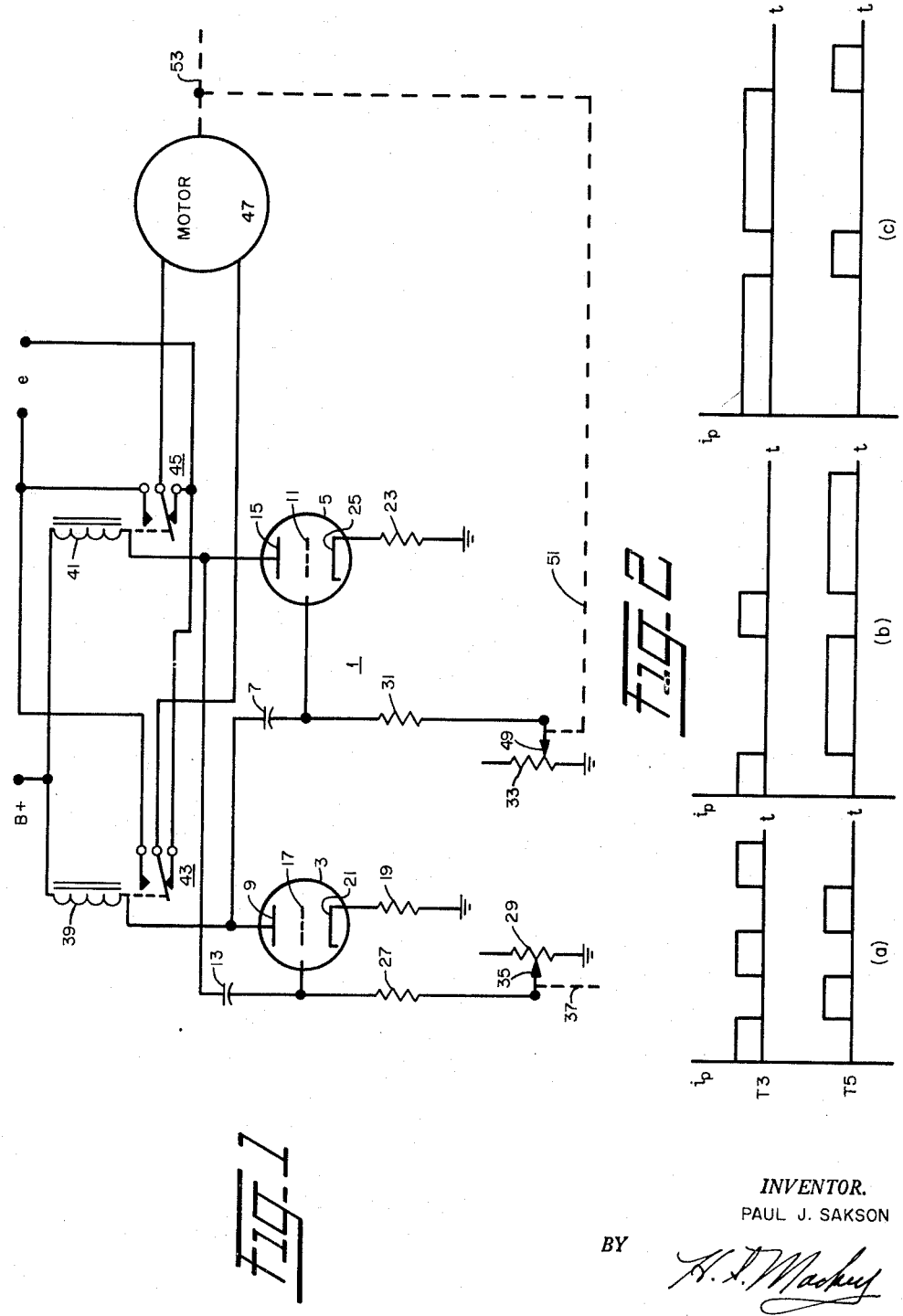

3,004,199
Patented Oct. 10, 1961

3,004,199
MULTIVIBRATOR CONTROLLED SERVO
MECHANISM
Paul J. Sakson, Yorktown Heights, N.Y., assignor to
General Precision, Inc., a corporation of Delaware
Filed Sept. 4, 1958, Ser. No. 758,954
5 Claims. (Cl. 318—28)

This invention relates to position servo mechanisms and more particularly to servo mechanisms utilizing multivibrators for controlling the servo motor operation.

One object of the invention is to provide smooth, accurate and reliable servo motor operation.

Another object of the invention is to provide a position servo mechanism which may be used with either an alternating current or direct current power supply.

A further object of the invention is to provide a position servo having a small number of parts and which is easily manufactured from standard components.

The invention contemplates a servo mechanism comprising, a multivibrator including a plurality of pairs of output and control electrodes, variable circuit means connected to the control electrodes and adapted to be adjusted by an amount corresponding to an error signal for varying the duration of the output from one of the output electrodes, a servo motor, switching means connected to the output electrodes and adapted to connect the servo motor to a source of energizing voltage and to provide servo motor movement in one direction when one output electrode is energized and in the opposite direction when the other output electrode is energized, and feedback means between the motor and the variable circuit means for adjusting the variable circuit means to return the system to equilibrium after the correction commanded by the error signal has been made.

The foregoing and other objects and advantages of the invention will appear more clearly from a consideration of the specification and drawings wherein one embodiment of the invention is described and shown for illustration purposes only.

In the drawings:

FIGURE 1 is a schematic diagram of a position servo system constructed in accordance with the invention; and FIGURE 2 is a graphical representation of plate current v. time for different operating conditions of the circuit.

In FIG. 1 a multivibrator 1, of conventional design, has a pair of triode vacuum tubes 3 and 5. A condenser 7 connects the plate 9 of tube 3 to the grid 11 of tube 5 and a condenser 13 connects the plate 15 of tube 5 to the grid 17 of tube 3. A resistor 19 connects the cathode 21 of tube 3 to ground and a resistor 23 connects the cathode 25 of tube 5 to ground.

A fixed resistor 27 and a variable resistor 29 are connected in series between grid 17 and ground and a similar fixed resistor 31 and a variable resistor 33 are connected between grid 11 and ground. The wiper 35 of variable resistor 29 is mechanically coupled to a source of error signal, not shown, by a shaft 37.

The plates 9 and 15 are connected to a source of direct current voltage B+ through relay coils 39 and 41, respectively. Relay coils 39 and 41 when energized operate switches 43 and 45, respectively. Switches 43 and 45 are both shown in their deenergized position and will upon the institution of operation assume opposite positions since only one relay coil will be energized at any given time.

Switches 43 and 45 are so arranged that servo motor 47 will be connected across energizing voltage source e in one direction when relay coil 39 is energized and in the opposite direction when relay coil 41 is energized.

The wiper 49 of variable resistor 39 is connected by a shaft 51 to servo motor output shaft 53. Shafts 51 and 53 are so arranged that as servo motor 47 and output shaft 53 are rotated wiper 49 will follow wiper 35 of variable resistor 29.

Initially, prior to the application of error signals by a displacement of shaft 37, sliders 35 and 49 are set at the mid-point of variable resistors 29 and 33, respectively, and multivibrator 1 operates symmetrically. That is, the plate currents of tubes 3 and 5 are of equal amplitude and have the same time duration as is shown in FIG. 2 graphs a. Therefore, switches 43 and 45 are operated for equal periods of time and output shaft 53 of servo motor 47 oscillates symmetrically about an average value without producing a net torque or force. Slide wire 49 also oscillates symmetrically about the mid-point of variable resistor 33 so that the average value of variable resistor 33 equals the value of variable resistor 29 and the duration of the plate currents remains equal.

Thereafter as slider wire 35 is displaced in response to error signals applied via shaft 37 the grid resistance of tube 3 is changed; thus, the time required to discharge condenser 13 is changed and the duration of the plate current is altered. This changes the ratio of the times that switches 43 and 45 are operated and produces a net displacement of output shaft 53 of motor 47. Shaft 51 feeds back a portion of this displacement to cause slide wire 49 to follow slide wire 35 and when the average value of variable resistor 33 equals the value of variable resistor 29 the system is again in equilibrium and the plate currents in tubes 3 and 5 flow for equal lengths of time.

Graphs b of FIG. 2 show the effect of a displacement of slide wire 35, in one direction, on the plate current of tubes 3 and 5 and graph c shows the effect of a displacement in the opposite direction.

While the multivibrator disclosed utilizes vacuum tubes, transistors could be substituted therefor without changing the inventive concept.

The disclosed servo mechanism may be used to great advantage in any system which offers low pass filtering such as is found in air craft, marine or fluid control application since the steady state high frequency oscillations of motor 47 would be attenuated thereby.

Although one embodiment only of the invention has been shown and described in detail it is to be expressly understood that the invention is not limited thereto.

What is claimed is:

1. A position servo system comprising, a multivibrator including a first and second pair of output and control electrodes, first independently variable circuit means connected to the control electrode of the first pair and adapted to be adjusted by an amount corresponding to an error signal for varying the duration of the output from the output electrode of the first pair, a servo motor, switching means connected to the output electrodes and adapted to connect the servo motor to a source of energizing voltage and to provide servo motor movement in one direction when the first output electrode is energized and movement in the opposite direction when the second output electrode is energized, second independently variable circuit means connected to the control electrode of the second pair of electrodes, and feedback means connected between the motor and the second independently variable circuit means for adjusting said second independently variable circuit means to return the system to equilibrium after the correction commanded by the error signal has been made.

2. A position servo system comprising, a multivibrator including first and second control electrodes and first and second output electrodes, first independently variable circuit means connected to the first control electrode for regulating the duration of the output of the first output electrode as a function of an error signal, a servo motor, first and second switch means connected to the first and second output electrodes respectively and arranged to connect said motor to a source of energizing voltage for operating said motor in one direction when the first output electrode has an output and in the opposite direction when the second output electrode has an output, second independently variable circuit means connected to the second control electrode, and feedback means between the motor and the second independently variable circuit means for varying the circuit means as a function of motor displacement to return the system to equilibrium after the correction commanded by the error signal has been made.

3. A position servo system comprising, a multivibrator including at least two pairs of output and control electrodes, independently variable circuit means connected to each of said control electrodes, one of said variable circuit means being adapted to be adjusted by an amount corresponding to an error signal for varying the duration of the output from one of the output electrodes, a servo motor, switching means connected to the output electrodes and adapted to connect the servo motor to a source of energizing voltage for providing motor movement in one direction when one output electrode is energized and movement in the opposite direction when the other output electrode is energized, and feedback means connected between the motor and the other independently variable circuit means for adjusting the said other independently variable circuit means to return the system to equilibrium after the correction commanded by the error signal has been made.

4. A position servo system as set forth in claim 3 in which each of said independently variable circuit means comprises a slide wire potentiometer having one end grounded and its slide wire electrically connected to its associated control electrode, said one slide wire being adjusted by an amount corresponding to the error signal, and said other slide wire being adjusted by the feedback means.

5. A position servo system as set forth in claim 3 in which said switching means includes a first relay coil connected in series with one output electrode, and a second relay coil connected in series with the other output electrode, said relay coils being alternately energized by the connected output electrodes.

References Cited in the file of this patent

UNITED STATES PATENTS

| | | |
|---|---|---|
| 2,246,686 | Jones | June 24, 1941 |
| 2,422,687 | Lillienthal | June 24, 1947 |

OTHER REFERENCES

"Multivibrators," article by Ed Bukstein, Radio, vol. 25, No. 5, May 1954 (250–36.132C), p. 84 and FIG. 5 p. 86.

Terman, F. E.: Electronic and Radio Engineering, fourth edition, p. 626 and p. 627, 3rd paragraph, McGraw-Hill, New York, 1955.